(12) United States Patent
Lazarus

(10) Patent No.: US 6,567,493 B2
(45) Date of Patent: May 20, 2003

(54) CORE SPRAY SPARGER ASSEMBLY

(75) Inventor: Jonathan David Lazarus, Sunnyvale, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/682,460

(22) Filed: Sep. 5, 2001

(65) Prior Publication Data

US 2003/0043955 A1 Mar. 6, 2003

(51) Int. Cl.[7] .................................................. G21C 7/00
(52) U.S. Cl. ........................ 376/282; 376/285; 376/286; 376/352
(58) Field of Search ................................. 376/282, 285, 376/286, 352, 438, 462

(56) References Cited

U.S. PATENT DOCUMENTS

| | | | | |
|---|---|---|---|---|
| 4,093,513 A | * | 6/1978 | Berens et al. | 376/282 |
| 4,557,890 A | * | 12/1985 | Matsuda et al. | 376/282 |
| 4,859,403 A | | 8/1989 | Dixon et al. | 376/286 |
| 5,737,380 A | | 4/1998 | Deaver et al. | 376/352 |
| 5,803,688 A | | 9/1998 | Gleason et al. | 411/344 |
| 5,912,936 A | | 6/1999 | Charnley et al. | 376/282 |
| 5,947,529 A | | 9/1999 | Jensen | 285/123.6 |

* cited by examiner

Primary Examiner—Michael J. Carone
Assistant Examiner—Jack Keith
(74) Attorney, Agent, or Firm—Armstrong Teasdale LLP

(57) ABSTRACT

A core spray sparger assembly for supplying coolant to a nuclear reactor. The nuclear reactor includes fuel assemblies, a top guide, coolant supply pipes and a shroud head. The core spray sparger assembly includes at least one coolant manifold, at least one coolant coupling in fluid communication with the coolant manifold, and at least one mounting device configured to couple the coolant manifold to the nuclear reactor. The core spray sparger assembly further includes a plurality of fluid conductors in a parallel array positioned above the fuel assemblies, the fluid conductors in fluid communication with the coolant manifold, and a plurality of nozzles in fluid communication with the fluid conductors.

34 Claims, 4 Drawing Sheets

CORE SPRAY SPARGER ASSEMBLY

BACKGROUND OF INVENTION

This invention relates generally to nuclear reactors and more particularly, to core spray sparger assemblies within such reactors.

A reactor pressure vessel (RPV) of a boiling water reactor (BWR) typically has a generally cylindrical shape and is closed at both ends, e.g., by a bottom head and a removable top head. A shroud surrounds the core and is supported by a shroud support structure.

Boiling water reactors have numerous piping systems, and such piping systems are utilized, for example, to transport water throughout the RPV. For example, some BWR's include an emergency core cooling system, configured to spray coolant over each fuel assembly in the event of a loss of coolant accident. Core spray piping is used to supply water from outside the RPV to core spray spargers inside the RPV. The core spray spargers supply coolant to the fuel assemblies. In some situations, the core spray sparger can supply coolant containing boron to the fuel assemblies to suppress fission.

Core spray spargers are generally classified as ring spargers or grid spargers. Both types require extensive, laborious efforts to ensure coolant is supplied to the fuel assemblies. Ring spargers generally include peripheral rings with adjustable spray nozzle units. Ring spargers nozzle units require time consuming field alignment of each nozzle unit. Such field alignment is particularly difficult if nozzle units must be replaced or temporally removed after reactor operation due to the radiation field. Grid spargers generally include a complex grid that can cause an undesirable pressure drop in the normal coolant flowpath and complicates inspection of RPV areas above the fuel assemblies. Further, grid spargers themselves require extensive inspection due to the number of components, welds, and joints presented by their construction.

SUMMARY OF INVENTION

In one aspect, a core spray sparger assembly is provided for a nuclear reactor that includes fuel assemblies, a top guide, coolant supply pipes and a shroud head. The core spray sparger assembly includes at least one coolant manifold, at least one coolant coupling in fluid communication with the coolant manifold, and at least one mounting device configured to couple the coolant manifold to the nuclear reactor. The core spray sparger assembly further includes a plurality of fluid conductors in a parallel array positioned above the fuel assemblies, the fluid conductors in fluid communication with the coolant manifold, and a plurality of nozzles in fluid communication with the fluid conductors.

In another aspect, a core spray sparger assembly is provided for a nuclear reactor that includes a top guide and fuel assemblies. The core spray sparger assembly includes a pair of independent, coaxial, substantially circular, coolant manifolds, joined by a plurality of resilient couplings. The core spray sparger assembly also includes at least one coolant coupling in fluid communication with each coolant manifold and at least one boron coolant coupling in fluid communication with each coolant manifold. The core spray sparger assembly further includes at least one mounting device, two parallel arrays, at least one stabilizing member, and a plurality of nozzles. The mounting device couples the coolant manifolds to the nuclear reactor. Two parallel arrays of fluidically independent, parallel fluid conductors are configured to be positioned above the reactor top guide, each array in fluid communication with one of the coolant manifolds. The stabilizing member is coupled to one of the coolant manifolds and at least one of the fluid conductors. The nozzles are in fluid communication with the fluid conductors.

In another aspect, a nuclear reactor is provided that includes a plurality of fuel assemblies, at least one coolant supply pipe, a top core guide above side fuel assemblies, a shroud head above the top core guide, and a core spray sparger assembly. The core spray sparger assembly includes at least one coolant manifold, at least one coolant coupling in fluid communication with the coolant manifold, at least one mounting device coupling the coolant manifold to the nuclear reactor, a plurality of fluid conductors in a parallel array, positioned above the top guide, in fluid communication with the coolant manifold, and a plurality of nozzles in fluid communication with the fluid conductors, configured to supply coolant to the fuel assemblies.

DETAILED DESCRIPTION

Figure 1:
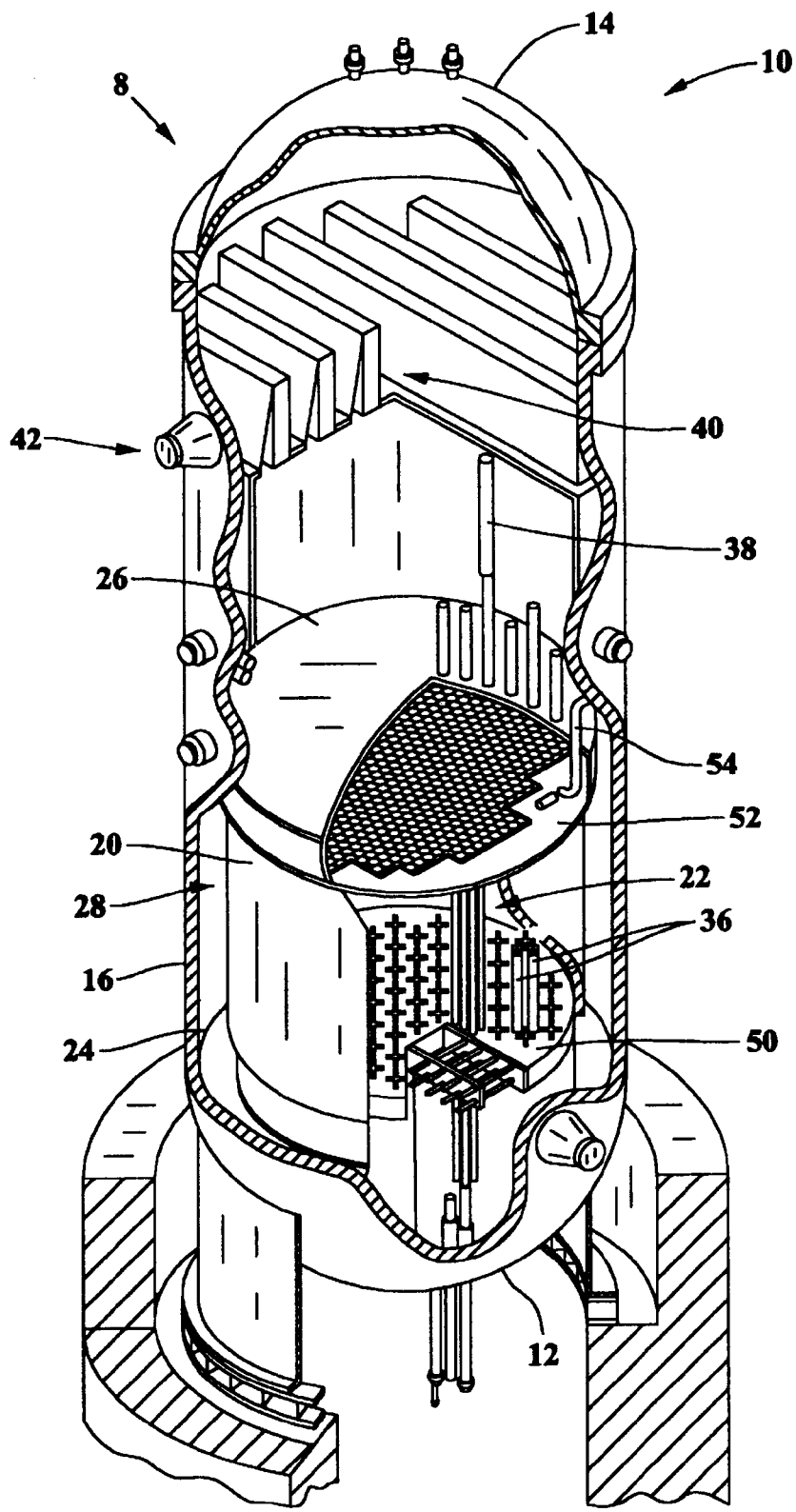
FIG. 1 is a sectional view, with parts cut away, of a boiling water reactor.

FIG. 1 is a sectional view, with parts cut away, of a boiling water reactor (BWR) 8 including a reactor pressure vessel (RPV) 10. RPV 10 has a generally cylindrical shape and is closed at one end by a bottom head 12 and at its other end by a removable top head 14. A side wall 16 extends from bottom head 12 to top head 14. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16.

Heat is generated within core 22, which includes fuel assemblies 36 of fissionable material. Water circulated up through core 22 is at least partially converted to steam. Steam separators 38 separates steam from water, which is recirculated. Residual water is removed from the steam by steam dryers 40. The steam exits RPV 10 through a steam outlet 42 near vessel top head 14.

Fuel assemblies 36 are aligned by a core plate assembly 50 located at the base of core 22. A top guide 52 aligns fuel assemblies 36 as they are lowered into core 22. Core plate 50 and top guide 52 are supported by core shroud 20. Core spray supply pipes 54 supply coolant to the core 22 during a loss of coolant accident.

Figure 2:
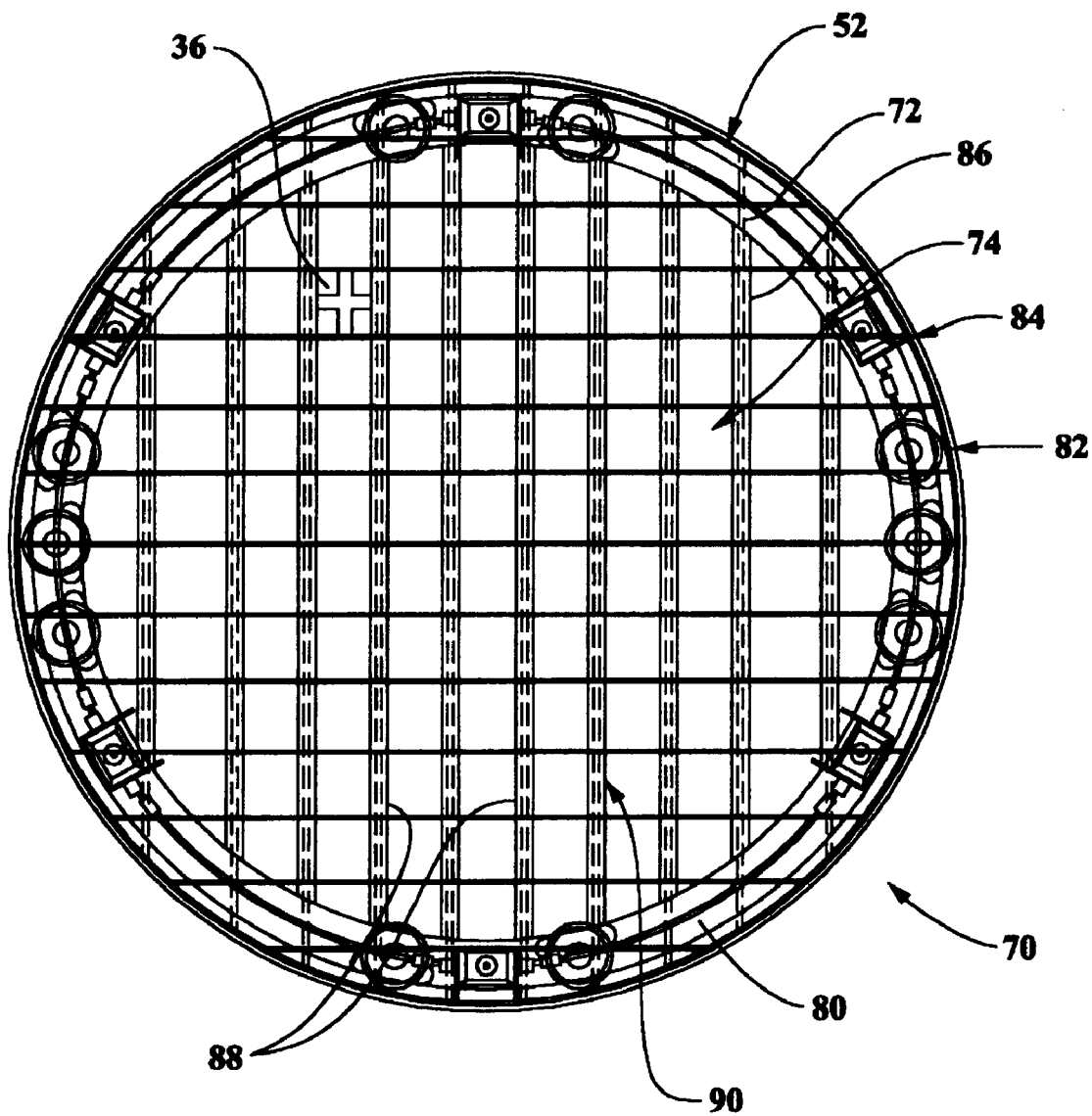
FIG. 2 is a top view schematic of a core spray sparger assembly positioned above a top guide shown in FIG. 1.

FIG. 2 is a top view schematic of a core spray sparger assembly 70 positioned above top guide 52, shown in FIG. 1. Top guide 52 is a latticed structure including several top guide beams 72 defining top guide openings 74. Top guide openings 74 are sized to receive fuel assemblies 36. Core spray sparger assembly 70 includes coolant manifolds 80, coolant couplings 82 configured to mate with coolant supply pipes 54 (shown in FIG. 1), mounting devices 84 coupling coolant manifold 80 to BWR 8 (shown in FIG. 1), and fluid conductors 86 in a parallel array 88. Core spray sparger assembly 70 further includes nozzles 90 in fluid communication with fluid conductors 86.

Figure 3:
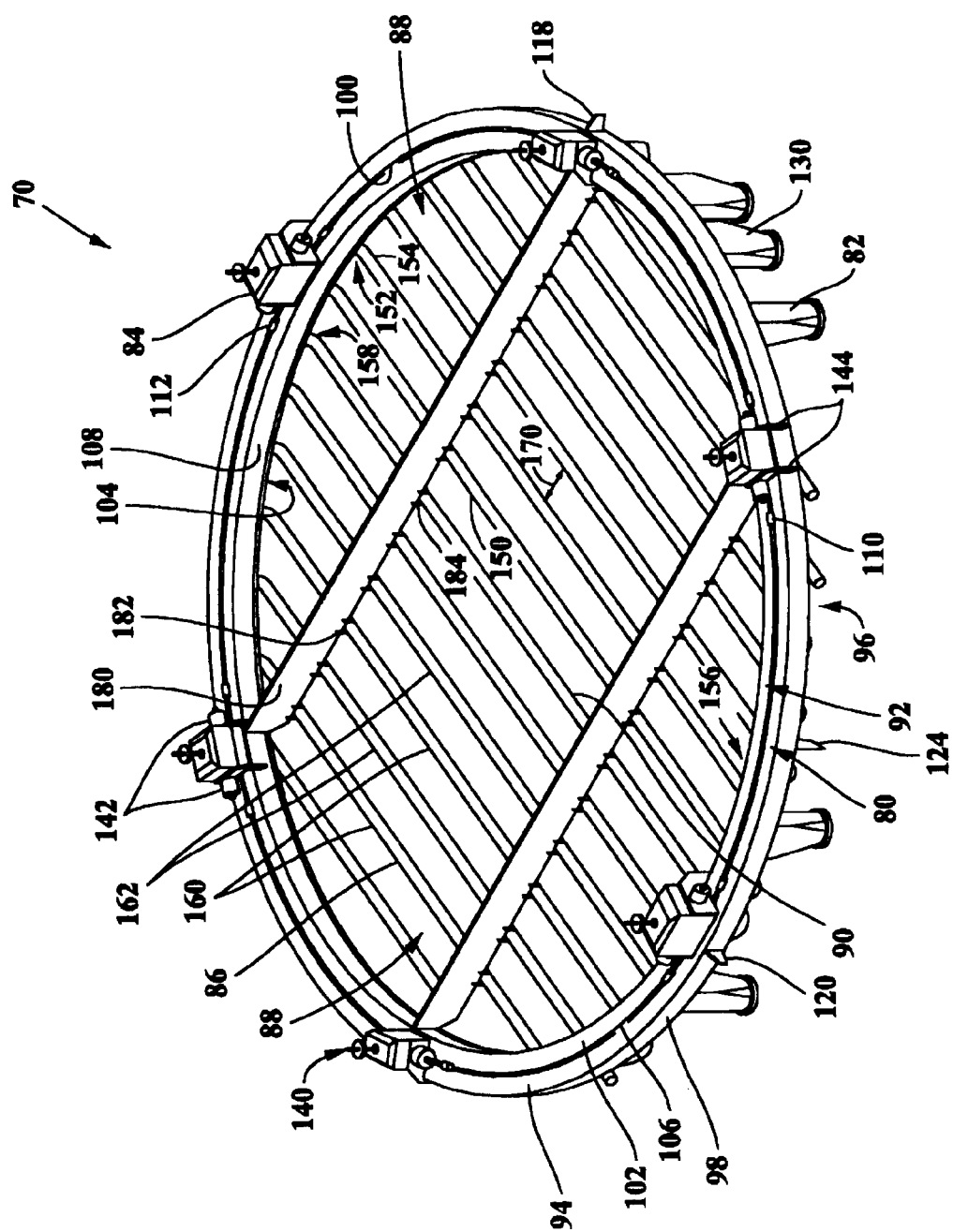
FIG. 3 is a perspective view of a core spray sparger assembly of FIG. 2.

FIG. 3 is a perspective view of core spray sparger assembly 70. In one embodiment, two fluidically independent, redundant coolant manifolds 80, 92 are provided in a coaxial, substantially circular arrangement. Coolant manifold 80 includes an upper surface 94, a lower surface 96, an outer face 98 and an inner face 100, while coolant manifold 92 includes an upper surface 102, a lower surface 104, an outer face 106 and an inner face 108. In the exemplary embodiment, coolant manifolds 80 and 92 are concentric. In another embodiment, coolant manifolds 80 and 92 are stacked vertically (not shown). Coolant manifolds 80 and 92 are shown in FIG. 3 with substantially rectangular cross-sections, but other configurations include, for example, circular, square and oval cross-sections. Coolant manifolds 80 and 92 are joined together by resilient couplings 110. Resilient couplings 110 secure manifolds 80 and 92 together while facilitating differential thermal expansion between manifolds 80 and 92. In one embodiment, resilient coupling 110 includes a welded, metallic, U-shaped coupling 112 extending between upper surfaces 94 and 102, and lower surfaces 96 and 104. Coolant manifolds 80 and 92 are fluidically independent and redundant. Each coolant coupling 82 is fluidically coupled to one coolant manifold 80 or 92. Each fluid conductors 86 is fluidically coupled to one coolant manifold 80 or 92. A failure of any component connected to coolant manifold 80 does not prevent coolant manifold 92 from supplying coolant to fuel assemblies 36 (shown in FIGS. 1 and 2). In one embodiment, coolant manifolds 80 and 92 are each unitary constructs. In another embodiment, coolant manifolds 80 and 92 are formed using a plurality of sections.

Core spray sparger assembly 70 also includes alignment guides 118 configured to align coolant manifolds 80 with coolant supply pipes 54 (shown in FIG. 1). In one embodiment, alignment brackets 120 extend radially from coolant manifold outer face 98. Each alignment bracket 120 is configured to be received in an alignment slot (not shown) in shroud head 26. Alignment guides 118 also align core spray sparger assembly 70 to top guide 52. In one embodiment, alignment cones 124 extend from coolant manifold lower surface 96, coolant manifold lower surface 104, or both, to engage alignment sockets (not shown) in top guide 52 (shown in FIGS. 1 and 2).

Coolant couplings 82 join coolant supply pipes 54 (shown in FIG. 1) to coolant manifolds 80 and 92. The orientation, precise circumferential spacing, and number of coolant couplings 82 varies with specific reactor design considerations, but multiple, spaced coolant couplings 82 for each coolant manifold 80 and 92 facilitate the desired coolant flow volume and safety redundancy. In one embodiment, coolant couplings 82 include slip couplings with spherical seats (not shown), sized to receive supply pipes 54. As shown in FIG. 3, four coolant couplings 82 are welded to each coolant manifold lower surface 96 and 104 to facilitate supplying coolant from supply pipes 54 to each coolant manifold 80 and 92. In one embodiment, each lower surface 96 and 104 of coolant manifolds 80 and 92 are joined to a boron coolant coupling 130, configured to supply borated coolant. Coolant coupling 130 joins a selected coolant supply pipe (not shown) which is further connected to a borated coolant system (not shown).

Mounting devices 84 facilitate retention of core spray sparger assembly 70 within RPV 10. Mounting devices 84 include hanger bolts 140 that secure coolant manifold 80 and 92 to shroud head 26. Each hanger bolt 140 includes a trunnion 142 and a pair of stanchions 144. Stanchions 144 are welded to coolant manifold 80 and 92. In one embodiment, three, symmetrically-spaced hanger bolts 140 mount to coolant manifold 80, secured to upper surface 94 and to outer face 98 and three hanger bolts 140 mount to coolant manifold 92, secured to upper surface 102 and inner face 108. In another embodiment, core spray sparger assembly 70 includes more than three or less than three hanger bolts 140. Hanger bolts 140 support core spray sparger assembly 70 against fluid forces and flow induced vibrations, while accommodating differential thermal expansion. Hanger bolts 140 and trunnions 142 facilitate radial differential thermal expansion between shroud head 26 and core spray sparger assembly 70 by allowing fractional rotation of hanger bolts 140 about trunnions 142. In one embodiment, mounting devices 84 support core spray sparger assembly 70 above top guide 52. In another embodiment, both mounting devices 84 and top guide 52 support core spray sparger assembly 70.

Fluid conductors 86 are fluidically coupled to coolant manifolds 80 and 92 to form parallel array 88. Each fluid conductor 86 includes a longitudinal section 150, a proximate end 154, and a distal end 156. A connection section 152 at each proximate end 154 and each distal end 156 joins fluid conductors 86 to coolant manifolds 80 and 92 while facilitating differential thermal expansion. In one embodiment, connection sections 152 include transition elbows 158, which facilitate accommodation of thermal expansion and contraction. Fluid conductors 86 are separated into a first parallel array 160 and a second parallel array 162, fluidically independent of each other. Parallel arrays 160 and 162 are positioned above reactor top guide 52, with parallel array 160 in fluid communication with coolant manifold 80 and parallel array 162 in fluid communication with coolant manifold 92. First parallel array 160 and second parallel array 162 are interspersed with each other, such that fluid conductors 86 of first parallel array 160 alternate with fluid conductors 86 of second parallel array 162. Fluid conductors 86 of first array 160 are a horizontal spacing distance 170 from adjoining fluid conductors 86 of second array 162. In one embodiment, spacing distance 170 is substantially similar to the width of top guide opening 74, facilitating inspections and passage of fuel assemblies 36. First parallel array 160 and second parallel array 162 are configured such that each array 160 and 162 is proximate to each fuel assembly 36. Each array 160 and 162 is configured to supply coolant to each fuel assembly 36, providing redundant coolant flow. As shown in FIG. 3, fluid conductors 86 define a cylindrical cross-section. In alternate embodiments, fluid conductors 86 include rectangular, square or oval cross-sections.

In one embodiment, fluid conductors 86 are stabilized against flow induced vibrations by a stabilizing member 180. Stabilizing member 180 includes attachment devices 182 securing fluid conductors 86 to stabilizing member 180. Stabilizing member 180 is coupled to at least one of coolant manifold 80 and 92, and further coupled to at least one fluid conductor 86. Attachment devices 182 include support clips 184 extending from stabilizing member 180 and welded to fluid conductors 86. In another embodiment, stabilizing member 180 is coupled to selected fluid conductor 86 by restraining cavities (not shown) formed in stabilizing member 180, each sized to receive and restrain one fluid conductor 86. Because fluid conductors 86 can vary in length, in one embodiment, only selected fluid conductors 86 are secured to stabilizing member 180.

Nozzles 90 are fluidically coupled to each fluid conductor 86. Nozzles 90 are formed in each fluid conductor 86 by precision drilling, electric discharge machining (EDM), or other suitable techniques. In one embodiment, nozzle ports (not shown) are secured to each fluid conductor 86. More specifically, the nozzle ports are welded to fluid conductors 86. In another embodiment, nozzle ports are screwed into fluid conductors 86. Nozzle 90 location on each fluid conductor 86 is predetermined prior to forming or welding.

Nozzles 90 are formed, including location and shape, in each fluid conductor 86 such that each array 160 and 162 supplies coolant to each fuel assembly 36. Each nozzle 90 is targeted to a specific fuel assembly 36 (shown in FIGS. 1 and 2). Each fuel assembly 36 receives coolant from one nozzle 90 in array 160 and from one nozzle 90 in array 162. In another embodiment, one nozzle 90 is targeted to provide coolant to more than one fuel assembly 36.

In fabrication, nozzles 90 are formed in predetermined positions in fluid conductors 86. Fluid conductors 86 are then positioned in parallel arrays 160 and 162, a predetermined spacing distance 170 apart, aligned relative to each other, and joined to coolant manifolds 80 and 92. In another embodiment, parallel arrays 160 and 162 are joined to coolant manifolds 80 and 92, and then nozzles 90 are formed in predetermined location in fluid conductors 86. Spacing distance 170 between adjacent fluid conductors 86 is generally coordinated with top guide 52 (shown in FIG. 1) to facilitate minimizing obstruction of flow pass sparger assembly 70. In one embodiment, spacing distance 170 facilitates removal of fuel assemblies 36 during maintenance. Parallel arrays 160 and 162 are positioned above top guide beams 72 (shown in FIG. 2). Parallel array 160 and 162 are aligned to fuel assemblies 36 such that each fuel assembly 36 is targeted to receive coolant. More specifically, each parallel array 160 and 162 is configured such that each fuel assembly 36 receives coolant from each array 160 and 162.

In use, coolant couplings 82 are configured to receive supply pipes 54 and are in fluid communication with coolant manifolds 80 and 92. Fluid conductors 86 are in fluid communication with coolant manifold 80 such that coolant flows from the supply pipes 54, through coolant couplings 82, through coolant manifold 80 to fluid conductors 86. Coolant in fluid conductors 86 flows to nozzles 90. Parallel array 160 and 162 are aligned to fuel assemblies 36 and configured such that each fuel assembly 36 is targeted to receive coolant from each array 160 and 162 when coolant is supplied to core spray sparger assembly 70.

Figure 4:
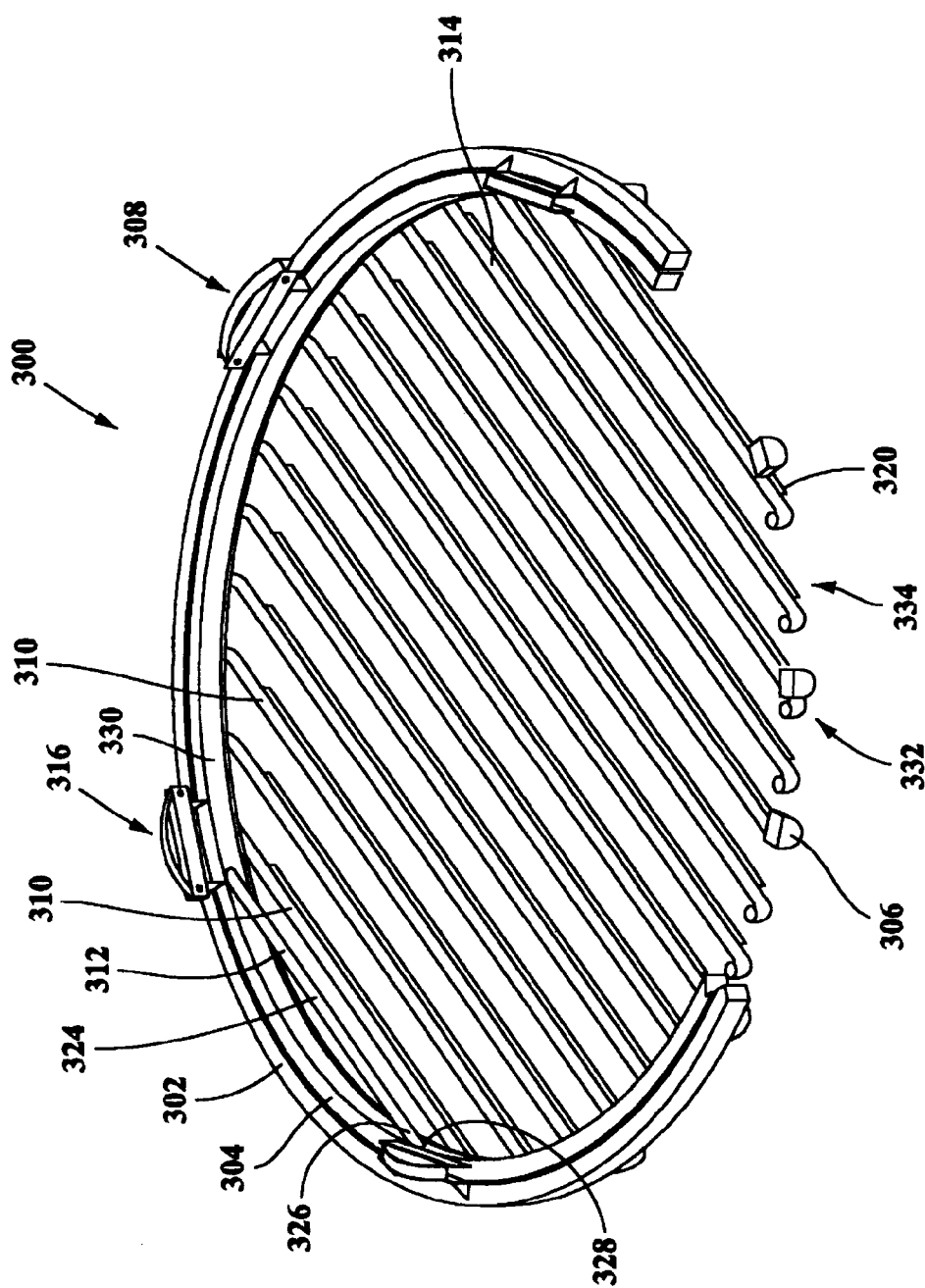
FIG. 4 is a perspective sectional, view of another embodiment of a core spray sparger assembly.

FIG. 4 is a perspective, sectional, view of another embodiment of a core spray sparger assembly 300. Core spray sparger assembly 300 includes a pair of coolant manifolds 302 and 304, coolant coupling 306, mounting devices 308, fluid conductors 310 and 312, and nozzles 314. Coolant manifolds 302, coolant coupling 306, and nozzles 314 are substantially identical, respectively, to coolant manifolds 80, coolant coupling 82, and nozzles 90 of core spray sparger assembly 70 described above.

Mounting devices 308 include leaf spring retainers 316 configured to secure core spray sparger assembly 300 between top guide 52 and shroud head 26 (shown in FIG. 1). Leaf spring retainers 316 are secured to each coolant manifold 302 and 304, such that leaf spring retainers 316 engage shroud head 26 when core spray sparger assembly 300 and shroud head 26 are installed in RPV 10. Leaf spring retainers 316 facilitate radial and vertical thermal expansion of core spray sparger assembly 300. In another embodiment, core spray sparger assembly 300 includes more than three or less than three leaf spring retainers 316.

Fluid conductors 310 include alignment guides 320. Alignment guides 320 are located on fluid conductors 310 to align core spray sparger assembly 300 to top guide 52 (shown in FIGS. 1 and 2). More specifically, fluid conductors 310 include channels 320 that mate to corresponding tongues (not shown) on top guide 52. Channels 320 facilitate aligning fluid conductors 310 such that nozzles 312 are aligned to supply coolant to each fuel assembly 36. Channel 320 may extend for less than the length of fluid conductor 310. In one embodiment, channels 320 substantially receive top guide beams 72. In one embodiment, only selected fluid conductors 310 include channels 320. In another embodiment, top guide 52 can include channels while fluid conductors 310 include corresponding tongues.

Fluid conductors 312 are positioned above fluid conductors 310. Fluid conductors 312 include a longitudinal section 324 and slip seats 326 that mate to coolant manifold 304. Slip seats 326, in conjunction with slip couplings 328 in an inner face 330 of coolant manifold 304, facilitate thermal expansion and contraction of fluid conductors 312. Coolant manifold 304 is substantially identical to coolant manifold 92, with the exception of receiving fluid conductors 312 in slip couplings 328 in inner face 330. Two fluid conductors 312 are mated to coolant manifold 304 positioned above fluid conductors 310.

Fluid conductors 312 are in a first array 332, which is in flow communication with coolant manifold 304. First array 332 includes all fluid conductors 312 and 310 in flow communication with coolant manifold 304. A second array 334 includes all fluid conductors 310 in flow communication with coolant manifold 302. Fluid conductors 310 and 312 are in either first array 332 or second array 334. In one embodiment, all fluid conductors in first array 332 are configured to mate with coolant manifold 304 through slip coupling seat 326 in inner face 330.

Core spray sparger assembly 70 facilitates distribution of coolant to each fuel assembly 36, minimizes the requirement for field alignment, and minimizes in-vessel inspection complexities to improve reactor maintenance practices and provide for great efficiency.

While the invention has been described in terms of various specific embodiments, those skilled in the art will recognize that the invention can be practiced with modification within the spirit and scope of the claims.

What is claimed is:

1. A core spray sparger assembly for a nuclear reactor comprising fuel assemblies, a top guide, coolant supply pipes and a shroud head, said core spray sparger assembly comprising:
   at least one coolant manifold, each said coolant manifold comprising a plurality of independent coolant manifolds joined by a plurality of resilient couplings;
   at least one coolant coupling in fluid communication with said coolant manifold;
   at least one mounting device configured to couple said coolant manifold to the nuclear reactor;
   a plurality of fluid conductors in a parallel array, positioned above the top guide, said fluid conductors in fluid communication with said coolant manifold; and
   a plurality of nozzles in fluid communication with said fluid conductors.

2. A core spray sparger assembly in accordance with claim 1 wherein said at least one coolant manifold comprises two fluidically independent, coaxial, substantially circular, coolant manifolds, joined by a plurality of resilient couplings.

3. A core spray sparger assembly in accordance with claim 1, further comprising at least one alignment guide configured to align said at least one coolant manifold with the top guide.

4. A core spray sparger assembly in accordance with claim 3, wherein at least one of said coolant manifolds comprises at least one alignment guide configured to align said at least one coolant manifold with the coolant supply pipes.

5. A core spray sparger assembly in accordance with claim 1, wherein said plurality of fluid conductors comprise at least two parallel arrays of fluidically independent, parallel fluid conductors configured to be positioned above the reactor top guide, each parallel array in fluid communication with one of said coolant manifolds.

6. A core spray sparger assembly in accordance with claim 5, wherein said plurality of nozzles are formed in each said parallel array such that each said parallel array is configured to supply coolant to each fuel assembly.

7. A core spray sparger assembly in accordance with claim 1, wherein said at least one mounting device comprises a plurality of spring retainers configured to secure at least one coolant manifold between the top guide and the shroud head.

8. A core spray sparger assembly in accordance with claim 1, wherein said at least one mounting device comprises a plurality of hanger bolts configured to secure at least one said coolant manifold to the shroud head.

9. A core spray sparger assembly in accordance with claim 8 wherein said at least one mounting device further comprises a trunnion.

10. A core spray sparger assembly in accordance with claim 1 further comprising at least one alignment guide.

11. A core spray sparger assembly in accordance with claim 10, wherein said at least one alignment guide comprises at least one alignment channel on at least one fluid conductors, said alignment channel configured to engage the reactor top guide.

12. A core spray sparger assembly in accordance with claim 1 further comprising at least one stabilizing member coupled to at least one of said coolant manifolds.

13. A core spray sparger assembly in accordance with claim 12 wherein said at least one stabilizing member is coupled to at least one of said fluid conductors by a welded support clip.

14. A core spray sparger assembly in accordance with claim 1 wherein each said fluid conductor comprises at least one connection section to facilitate differential thermal expansion between said at least one coolant manifold and each said fluid conductor.

15. A core spray sparger assembly in accordance with claim 1 wherein said plurality of nozzles comprise a plurality of orifices formed in said fluid conductors.

16. A core spray sparger assembly in accordance with claim 1 wherein said plurality of nozzles are formed in said fluid conductors such that each fuel assembly is supplied coolant from at least one nozzle.

17. A nuclear reactor comprising:
a plurality of fuel assemblies;
at least one coolant supply pipe;
a top core guide above side fuel assemblies;
a shroud head above said top core guide; and
a core spray sparger assembly comprising:
 at least one coolant manifold, each said coolant manifold comprising a plurality of independent coolant manifolds joined by a plurality of resilient couplings;
 at least one coolant coupling in fluid communication with said coolant manifold;
 at least one mounting device coupling said coolant manifold to the nuclear reactor;
 a plurality of fluid conductors in a parallel array positioned above said top guide, in fluid communication with said coolant manifold; and
 a plurality of nozzles in fluid communication with said fluid conductors.

18. A nuclear reactor in accordance with claim 17 wherein said at least one coolant manifold comprises two fluidically independent, coaxial, substantially circular, coolant manifolds, joined by a plurality of resilient couplings.

19. A nuclear reactor in accordance with claim 17 wherein at least one of said coolant manifolds comprises at least one alignment guide configured to align said at least one coolant manifold with said at least one coolant supply pipe.

20. A nuclear reactor in accordance with claim 17 wherein said plurality of fluid conductors comprise at least two parallel arrays of fluidically independent, parallel fluid conductors, each parallel array in fluid communication with one of said coolant manifolds.

21. A nuclear reactor in accordance with claim 20 wherein said plurality of nozzles are formed in each said parallel array such that each parallel array supplies coolant to each fuel assembly.

22. A nuclear reactor in accordance with claim 20 wherein each of said fuel assemblies receives coolant from at least one nozzle in each parallel array.

23. A nuclear reactor in accordance with claim 20 wherein each of said plurality of nozzles are formed in each said parallel array to supply coolant to at least one fuel assembly.

24. A nuclear reactor in accordance with claim 17 wherein each of said fluid conductors are a spacing distance apart, said spacing distance greater than a width of one of said plurality of fuel assembly.

25. A nuclear reactor in accordance with claim 17 wherein said at least one mounting device comprises a plurality of adjustable spring retainers securing at least one coolant manifold between said top guide and said shroud head.

26. A nuclear reactor in accordance with claim 17 wherein said at least one mounting device comprises a plurality of hanger bolts securing at least one said coolant manifold to said shroud head.

27. A nuclear reactor in accordance with claim 26 wherein said at least one mounting device further comprises a trunnion.

28. A nuclear reactor in accordance with claim 17 further comprising at least one alignment device aligning said fluid conductors with said fuel assemblies.

29. A nuclear reactor in accordance with claim 28 wherein said at least one alignment device comprises at least one alignment channel, each said alignment channel extending from said fluid conductors, said alignment channels engaging said reactor top guide.

30. A nuclear reactor in accordance with claim 17 further comprising at least one stabilizing member coupled to at least one of said coolant manifolds and at least one of said fluid conductors.

31. A nuclear reactor in accordance with claim 30 wherein said at least one stabilizing member is coupled to at least one of said fluid conductors by a welded support clip.

32. A nuclear reactor in accordance with claim 17 each said fluid conductor comprises at least one connection section configured to facilitate differential thermal expansion between said at least one coolant manifold and each said fluid conductor.

33. A nuclear reactor in accordance with claim 17 wherein said plurality of nozzles comprise a plurality of orifices formed in said fluid conductors.

34. A nuclear reactor in accordance with claim 17 wherein said plurality of nozzles are formed in said fluid conductors such that at least one nozzle supplies coolant to each said fuel assembly.

* * * * *